(12) United States Patent
Shen et al.

(10) Patent No.: US 9,177,318 B2
(45) Date of Patent: Nov. 3, 2015

(54) METHOD AND APPARATUS FOR CUSTOMIZING CONVERSATION AGENTS BASED ON USER CHARACTERISTICS USING A RELEVANCE SCORE FOR AUTOMATIC STATEMENTS, AND A RESPONSE PREDICTION FUNCTION

(71) Applicant: Palo Alto Research Center Incorporated, Palo Alto, CA (US)

(72) Inventors: Jianqiang Shen, Santa Clara, CA (US); Oliver Brdiczka, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 257 days.

(21) Appl. No.: 13/867,991

(22) Filed: Apr. 22, 2013

(65) Prior Publication Data

US 2014/0317030 A1    Oct. 23, 2014

(51) Int. Cl.
  *G06F 17/00* (2006.01)
  *G06Q 30/00* (2012.01)
  *G06N 3/00* (2006.01)

(52) U.S. Cl.
  CPC ............... *G06Q 30/01* (2013.01); *G06N 3/006* (2013.01)

(58) Field of Classification Search
  CPC ........................................................ G06N 3/006
  USPC .................................................... 706/12, 45
  See application file for complete search history.

(56) References Cited

U.S. PATENT DOCUMENTS

| 6,346,952 B1 * | 2/2002 | Shtivelman ............... 715/758 |
| 8,719,200 B2 * | 5/2014 | Beilby et al. ................ 706/45 |
| 2012/0284080 A1 * | 11/2012 | De Oliveira et al. ......... 705/7.29 |

* cited by examiner

*Primary Examiner* — David Vincent
(74) *Attorney, Agent, or Firm* — Shun Yao; Park, Vaughan, Fleming & Dowler LLP

(57) ABSTRACT

A conversation-simulating system facilitates simulating an intelligent conversation with a human user. During operation, the system can receive a user-statement from the user during a simulated conversation, and generates a set of automatic-statements that each responds to the user-statement. The system then determines a set of behavior-characteristics for the user, and computes relevance scores for the automatic-statements based on the behavior-characteristics. Each relevance score indicates an outcome quality that the user is likely to perceive for the automatic-statement as a response to the user-statement. The system selects an automatic-statement that has a highest relevance score from the set of automatic-statements, and provides the selected automatic-statement to the user.

17 Claims, 9 Drawing Sheets

METHOD AND APPARATUS FOR CUSTOMIZING CONVERSATION AGENTS BASED ON USER CHARACTERISTICS USING A RELEVANCE SCORE FOR AUTOMATIC STATEMENTS, AND A RESPONSE PREDICTION FUNCTION

STATEMENT OF GOVERNMENT-FUNDED RESEARCH

This invention was made with Government support under Contract No. W911NF-11-C-0216 awarded by the Army Research Office. The Government has certain rights in this invention.

RELATED APPLICATIONS

The subject matter of this application is related to the subject matter of the following applications:

U.S. patent application Ser. No. 13/663,747, entitled "METHOD AND SYSTEM FOR PSYCHOLOGICAL ANALYSIS BY FUSING MULTIPLE-VIEW PREDICTIONS," by inventors Jianqiang Shen and Oliver Brdiczka, filed 30 Oct. 2012; and U.S. patent application Ser. No. 13/660,959, entitled "METHOD AND SYSTEM FOR BUILDING AN ENTITY PROFILE FROM EMAIL ADDRESS AND NAME INFORMATION," by inventors Jianqiang Shen and Oliver Brdiczka, filed 25 Oct. 2012;

the disclosures of which are incorporated by reference in their entirety herein.

BACKGROUND

1. Field

This disclosure is generally related to artificial intelligence. More specifically, this disclosure is related to a conversation agent that adjusts a conversation style used to communicate with a user based on the user's behavioral characteristics.

2. Related Art

Different people prefer different communication styles. A person's personality and behavior characteristics influence how he communicates, and influences how he responds to other people's communication style. Some people, for example, may prefer a customer support agent that responds to their questions using brief and intelligent statements, which quickly give them the information they need. Other people, on the other hand, may prefer that the customer support agent feel more personable to them. They may prefer a customer support agent that uses a certain degree of humor, and perhaps shows more sympathy to their problem. An experienced customer support agent is oftentimes skilled at understanding people, and can adjust his communication style based on the needs of the customer he is assisting, much to the customer's satisfaction.

However, with the advent of the Internet age, it is becoming common for businesses in the service industry to reduce operating expenses by providing an Internet-based interface where customers can complete their business transactions without requiring the assistance of a human. These Internet-based services span various industries, such as banking, investments, merchandize, and insurance. If a user has a question or has trouble accessing a feature on the web interface, a self-sufficient user can oftentimes find a suitable answer by searching through a "support" forum accessible through the web interface. Not all users are self-sufficient, though, as some users may require a guided explanation to accessing a desired feature or solving a given problem.

Many of these businesses may also provide a chat interface through their web interface, where the customer can obtain answers to his questions without having to call the customer service agent. However, these chat interfaces oftentimes require a human to answer customers' questions, regardless of how simple these questions may be. While this does not require the human to answer telephone calls, it does not free the human to perform more complicated business tasks.

Some businesses may utilize an automated conversation agent, implemented by a computer program, to answer questions from customers. While this can help answer certain questions, these conversation agents do not always provide the best experience to the customer. Customers oftentimes perceive these conversation agents to sound robotic, and not very intelligent. Some conversation agents are designed to imitate a communication style for a certain user demographic, in an attempt to make them sound more human. Unfortunately, this can oftentimes make the conversation agent sound fake, as the conversation agent follows a script that doesn't adjust to each user's unique communication style.

SUMMARY

One embodiment provides a conversation-simulating system that facilitates simulating an intelligent conversation with a human user. During operation, the system can receive a user-statement from the user during a simulated conversation, and generates a set of automatic-statements that each responds to the user-statement. The system then determines a set of behavior-characteristics for the user, and computes relevance scores for the automatic-statements based on the behavior-characteristics. Each relevance score indicates an outcome quality that the user is likely to perceive for the automatic-statement as a response to the user-statement. The system selects an automatic-statement that has a highest relevance score from the set of automatic-statements, and provides the selected automatic-statement to the user.

In some embodiments, a respective behavior-characteristic indicates a personality-trait category, and indicates a numeric score for the corresponding personality-trait category.

In some embodiments, the personality-trait categories include one or more of: openness to experiences; conscientiousness; extraversion; agreeableness; self-esteem; novelty-seeking; perfectionism; rigidity; impulsivity; harm-avoidance; disinhibition; alexithymia; neuroticism; psychoticism; and obsessionality.

In some embodiments, the system can enhance the accuracy of the user's behavior characteristics by periodically selecting automatic-statements whose responses from the user can be used to refine the behavior characteristics. When the system identifies a personality-trait category to score for the user, the system determines an automatic-response associated with the personality-trait category, and provides the automatic-response to the user. Then, responsive to receiving a response from the user for the automatic-response, the system computes a score for the personality-trait category for the user, and updates the user's behavior-characteristics to assign the computed score to the personality-trait category.

In some embodiments, the system determines the set of automatic-statements, by determining a query from the user's user-statement, and identifying, from a response-template repository, one or more response templates that match at least one query attribute of the query. The response-template repository includes a set of pre-generated response templates that are each associated with at least one corresponding query attribute. The system then generates the set of automatic-statements based on the identified response templates.

In some embodiments, while computing the relevance score for a respective automatic-statement, the system computing a template-relevance score $S_T$ using a response-prediction function: $S_T = f_T(T,C)$. Here, T identifies a response template, C indicates the user's behavior-characteristics, and $S_T$ provides a score indicating how well response template T matches a conversation style for a user having behavior characteristics C.

In some embodiments, the system can train a response-prediction function by providing a survey, which indicates a set of conversation scripts, to a plurality of users. This survey solicits a response rating for one or more conversation responses in the conversation script. The system also obtains response ratings, from the users, for the conversation responses, and determines behavior characteristics for each of the plurality of users. The system then trains the response-prediction function based on the behavior preferences for the plurality of users, and the response ratings from each of the plurality of users.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a conversation-simulating system that solves the problem of simulating a natural conversation with a human user. Different users prefer different communication styles, and typical conversation agents are not capable of adjusting their conversation styles to how each user prefers to communicate. The conversation-simulating system can train a conversation agent to adjust its communication style to each user, based on the user's behavior characteristics and the user's personal communication style.

During a training phase, when preparing the conversation agent for a new user, the system gathers user information that can be used to understand the user's behavior characteristics. This user information can include existing user-generated content (UGC) from certain on-line services that the user has participated with, such as user emails, online social networks (e.g., Facebook, LinkedIn, etc.), online-chat services (e.g., Google Chat), online web logs (blogs), micro-blogging services (e.g., Twitter), etc. As the system gathers more UGC data related to the user, the system can analyze this data to extract behavior features and communication features that are unique to the user. The system uses these extracted features to generate a behavior model for the user, and to train the conversation agent to adjust its communication style, and adjust the type of information (and/or the amount of detail) that is communicated to the user.

Figure 1:
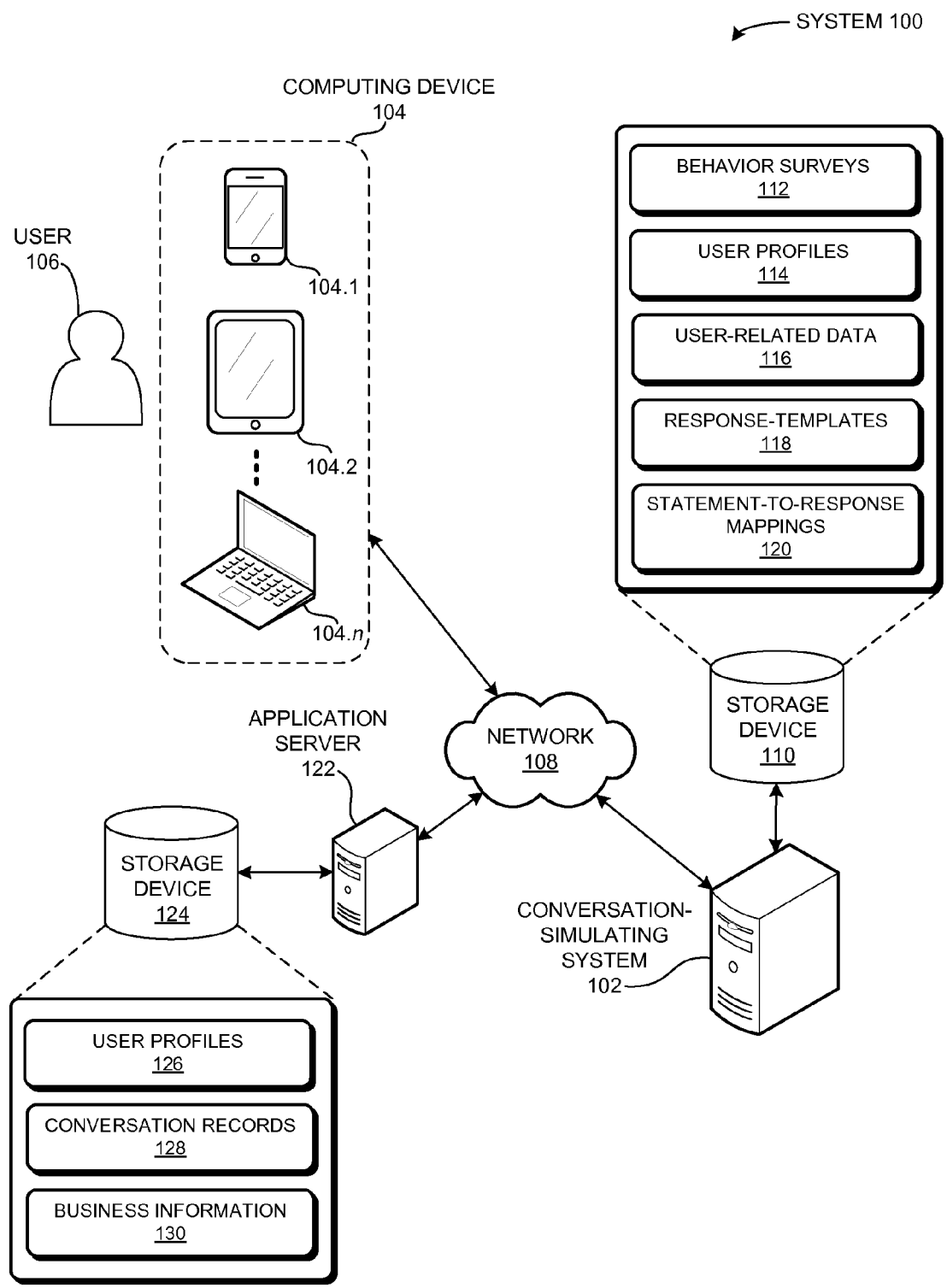
FIG. 1 illustrates an exemplary computer system that facilitates simulating an intelligent conversation with a user in accordance with an embodiment.

FIG. 1 illustrates an exemplary computer system 100 that facilitates simulating an intelligent conversation with a user in accordance with an embodiment. Computer system 100 can include a computing device 104 coupled to a network 108 and associated with a user 106, such as a portable computing device that user 106 can travel with, use to communicate with others, perform tasks, schedule meetings, and interact with an application server 122. For example, computing device 104 can include a smartphone 104.1, a tablet computer 104.2, or any other personal computing device 104.n such as a laptop computer, a desktop computer, etc.

Further, computer system 100 can include a computer network 108, which can include any wired or wireless network that interfaces various computing devices to each other, such as a computer network implemented via one or more technologies (e.g., Wi-Fi, cellular, Ethernet, fiber-optic, Bluetooth, etc.). For example, computer network 108 can interface computing device 104 to application server 122 and conversation-simulating system 122.

Conversation-simulating system 102 can train the conversation agent by presenting a survey to user 106, and analyzing the survey responses from user 106 to determine behavior characteristics for user 106. Conversation-simulating system 102 can include a storage device 110 that stores behavior surveys 112, and uses the survey responses from users to generate user profiles 114. Behavior surveys 112 can include questions designed to identify personality traits that are specific to user 106, such as the Myers-Briggs Type Indicator (MBTI) assessment test, which is designed to measure psychological preferences as to how users perceive their environment and make decisions. Other behavior surveys may include a chat session between two or more participants, and the survey responses from user 106 include a score indicating how effective user 106 perceives each response to be. The score may include a binary value (e.g., effective or not-effective), or may include a numeric value such as a weight within the range [0,10] where a weight of 0 indicates "not effective" and a weight of 10 indicates "most effective."

Conversation-simulating system 102 can also train the conversation agent by obtaining information related to user 106 from computing device 104 and application server 122. Conversation-simulating system 102 can receive UGC from computing device 104, such as content which user uploads or otherwise makes available to conversation-simulating system 102. Conversation-simulating system 102 can also receive, from application server 122, a user profile for user 106, conversation records related to user 106 (e.g., UGC data), and/or business information related to user 106. In some embodiments, user 106 can configure privacy settings for the online service hosted by application server 122 that control which information can be shared with other online services, which governs the user-related information that is accessible to conversation-simulating system 102. Conversation-simulating system 102 can store the user-related data 116 in short-term memory while generating user profiles 114 and training the conversation agent, and/or can store user-related data 116 in storage device 110 (a non-volatile storage device) for future use to re-train the conversation agent for different applications or different online services.

In some embodiments, application server 122 can correspond to an online service that user 106 may use to share personal information with others, such as an online social network, an online-chat service, or any service provided to user 106 via network 108. Conversation-simulating system 102 can interact with application server 122 to obtain user-related data 116 that user 106 has allowed to be shared with conversation-simulation system 102. For example, application server 122 may include a storage device 124, which stores user profiles 126 for various users, conversation records 128, and business information 130, some or all of which may be accessible to conversation-simulating system 102. User profiles 126 can include demographic information for user 106, behavior characteristics that have been determined for user 106, and/or any other profile information that facilitates targeting an online service to user 106. Conversation records 128 can include UGC generated by user 106, or UGC directed to user 106 by other users (e.g., by friends or colleagues). Business information 130 can indicate activities performed by user 106 through the online service, such as a number of games played via the online service, a number of advertisements hosted via the online service that were viewed by user 106, etc.

In some embodiments, conversation-simulation system 102 can provide the conversation agent as a service for various businesses and on-line services. Application server 122 can correspond to such an on-line service that uses the conversation agent to interact with user 106 in a way that feels friendly and personable to user 106. This online service can correspond to a wide range of service-based or consumer-oriented industries, such as the banking industry, the insurance industry, government agencies, entertainment industry, social-networking services, etc. Large banks, for example, are oftentimes encouraging their customers to do more of their banking on-line, as it reduces their operating expenses. Hence, these banks can use the conversation agent to answer questions that are frequently asked to real-life tellers, and to provide these answers in a way that feels as if the answers are originating from a real-life bank teller. This allows these banks to provide low-cost or no-cost banking services, while still providing a pleasant experience to the user.

Conversation-simulating system 102 can customize the conversation agent to the service provided by application server 122, for example, by obtaining user profiles 126, conversation records 128, and business information 130 from application server 122. Conversation-simulating system 102 uses this information to generate behavior surveys 112 that are derived from conversation records 128, such as conversations between users and a customer representative of the online service, or conversations between two or more users (e.g., a discussion forum where users can have their questions answered by other users and/or a customer representative).

Also, conversation-simulating system 102 can use conversation records 128 and business information 130 to generate response template 118, which can provide specific answers to common questions, or can provide a template for answering user-specific questions. For example, conversation-simulating system 102 may determine that, during conversations with various users, a conversation agent has answered the same question (or similar questions) using different sentence structures and/or using different user-specific data (e.g., user-account information from business information 130). Hence, conversation-simulating system 102 can generate various response templates that correspond to the same question, such that each template can provide a response in a way that feels right to a given user demographic, and each template can include data fields that can be filled-in with information that is specific to a given user. Conversation-simulating system 102 can also create statement-to-response mappings 120, which system 102 uses to select a set of response templates for a given statement from user 106. Note that each response template can be associated with a set of behavior characteristics, which system 102 can use to map the response template to a given user demographic. System 102 can select a response template that is most appropriate to user 106 by determining which response template is most closely related to the user demographic or behavior profile of user 106.

Figure 2:
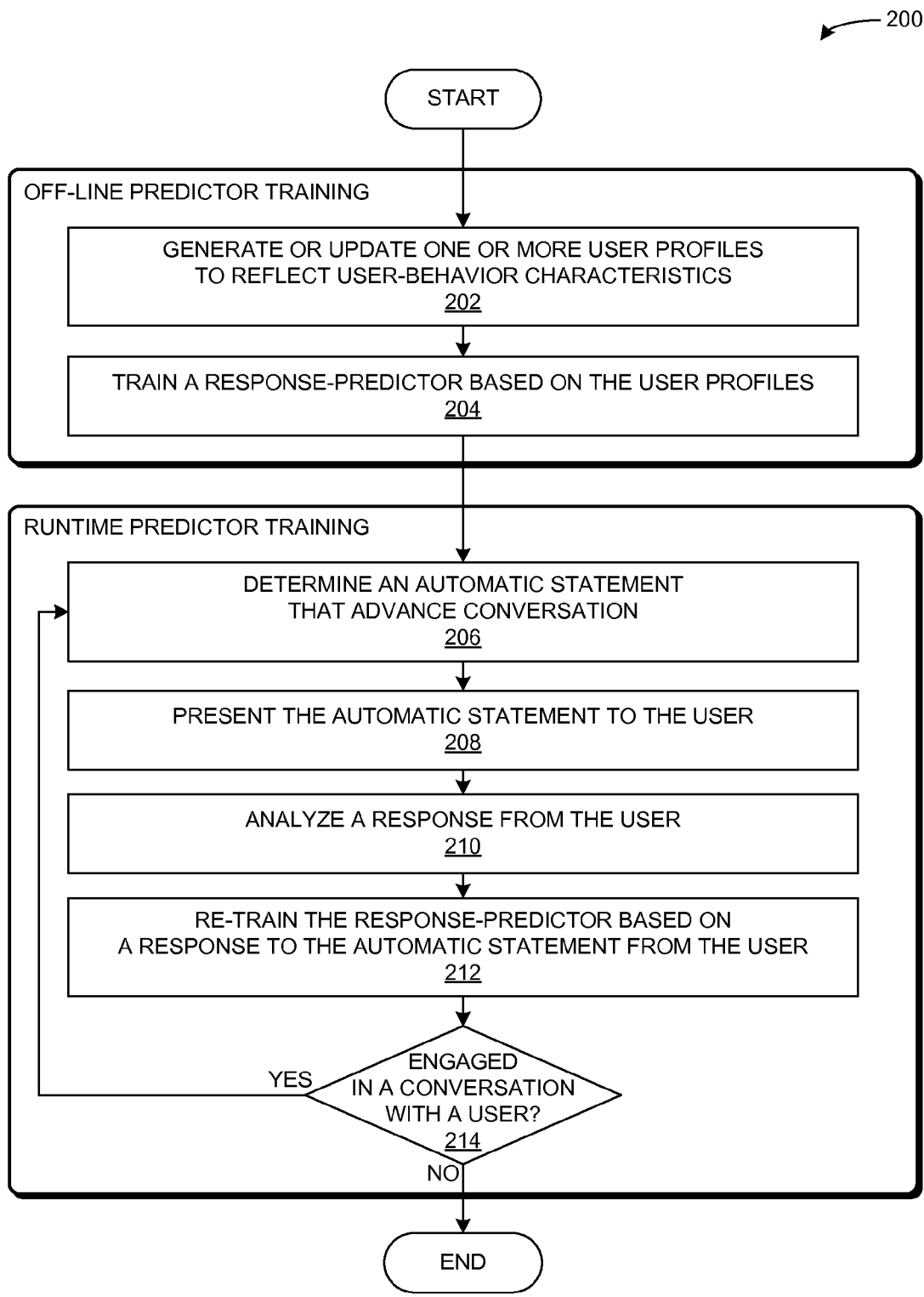
FIG. 2 presents a flow chart illustrating a method for training a conversation agent before and during a conversation with a user in accordance with an embodiment.

FIG. 2 presents a flow chart illustrating a method 200 for training a conversation agent before and during a conversation with a user in accordance with an embodiment. During operation, the system generates or updates one or more user profiles to reflect user-behavior preferences (operation 202), such that each user profile indicates behavior characteristics for a corresponding user. The system can generate a user profile for a user when the user first registers with the automated-conversation system, or with an application server that utilizes the conversation agent to interact with the user. Also, the system can update the user's profile periodically by obtaining and analyzing new information about the user. The system then periodically trains a response-predictor based on the user profiles (operation 204), for example, to account for new or recently updated user profiles.

Once the system has trained the conversation agent's response predictor, the conversation agent can carry a conversation with users to provide information related to a service from an application server, in a way that's customized to each user's communication style. At runtime, the system can determine an automatic statement that advances the chat session (operation 206). For example, the system may receive a conversation message from the user (e.g., a comment or a question), at which point the system generates a response that properly addresses the user's message. As another example, if the system determines that the conversation has stalled, the system generates a statement that can advance the conversation with the user. The system then presents the automatic statement to the user (operation 208), which may or may not solicit a response from the user.

In some embodiments, the system can re-train the response predictor based on a user response to the automatic statement (or a lack of a user response). The system analyses the response from the user (operation 210) to detect user-sentiment indicators, which indicate whether the automatic statement succeeded in advancing the conversation with the user. These user-sentiment indicators can indicate, for example, a conversational tone from the user, statements which indicate that the user approves or disapproves the automatic statement, a time interval between the automated statement and the user response, etc. The conversational tone can indicate which statements aggravate the user, please the user, bore the user, get the user interested or excited on the conversation topic, etc. Also, a short time interval between the automated statement and the user response may indicate that the user is actively engaged in the conversation, while a longer time interval may indicate that the user is losing interest in the conversation.

The user statements indicating that the user approves or disapproves the automatic statement can include words or phrases that praise the automated statement (e.g., "Thanks!"), or a happy emoticon (e.g., ":-D"). The user statements indicating that the user disapproves the automatic statement can include words or phrases that indicate dissatisfaction (e.g., "What?" "Hmmm."), or a sad or confused emoticon (e.g., ">.<" or ":-/").

The system can re-train the response predictor based on the responses to the automatic statement(s) (operation 212). In some embodiments, the system can determine from the user's response whether the automatic statement was a good match to the user's behavior characteristics. For example, the system can determine whether the automatic statement answered a question from the user, whether the tone in the automatic statement sounded natural and pleasant to the user, and/or whether the user sounded pleased with the automatic statement. The system also determines which user-behavior characteristics are a good match (or a bad match) to the automated statement, and trains the response-predictor to provide (or not provide) the automated statement to users with these user-behavior characteristics.

The system then determines whether it is engaged in a conversation session with a user (operation 214). For example, the system may determine that the conversation agent is currently engaged in an active conversation with the user based on whether the current conversation has been concluded, based on whether the latest response from the user terminates the conversation, or whether there's a likelihood the user may ask another question. If the conversation agent is engaged in a conversation, the system can return to operation 208 to determine automatic statements that advance the conversation. The automatic statement may provide a response to a statement received from the user during operation 210, or may provide a statement that may enhance the user experience (e.g., by making small-talk or telling a joke that can make the user feel a human-like connection with the conversation agent).

In some embodiments, if a sequence of recent messages from the user do not represent a completed thought, the system may wait for a predetermined time period before performing operation 206 to advance the conversation. If the user does not complete his thoughts after the predetermined time period, the system may return to operation 206 to ask the user if he is still present, or to ask the user a question regarding the topic being discussed with the user.

On the other hand, if the conversation agent is no longer engaged in an active conversation, the system can terminate the simulated conversation with the user. For example, the system may determine during operation 210 that the user's response indicates that the user is concluding the conversation. The user's response may indicate that he is satisfied with the information provided in the automatic response (e.g., by typing "Thanks, that was helpful."), or may indicate that he is leaving the conversation (e.g., by typing "Bye," "Goodbye," or an equivalent expression).

In some embodiments, the user may conclude the conversation by stating that he is not satisfied with the conversation, such as by saying "That doesn't help, but thanks anyway."). In this case, the system can return to operation 206 to politely conclude the simulated conversation with the user (e.g., during operations 206-208), and to retrain the response-predictor to provide a better experience or better information to the user during a later simulated conversation (e.g., during operations 210-212).

Off-Line Predictor Training

Figure 3:
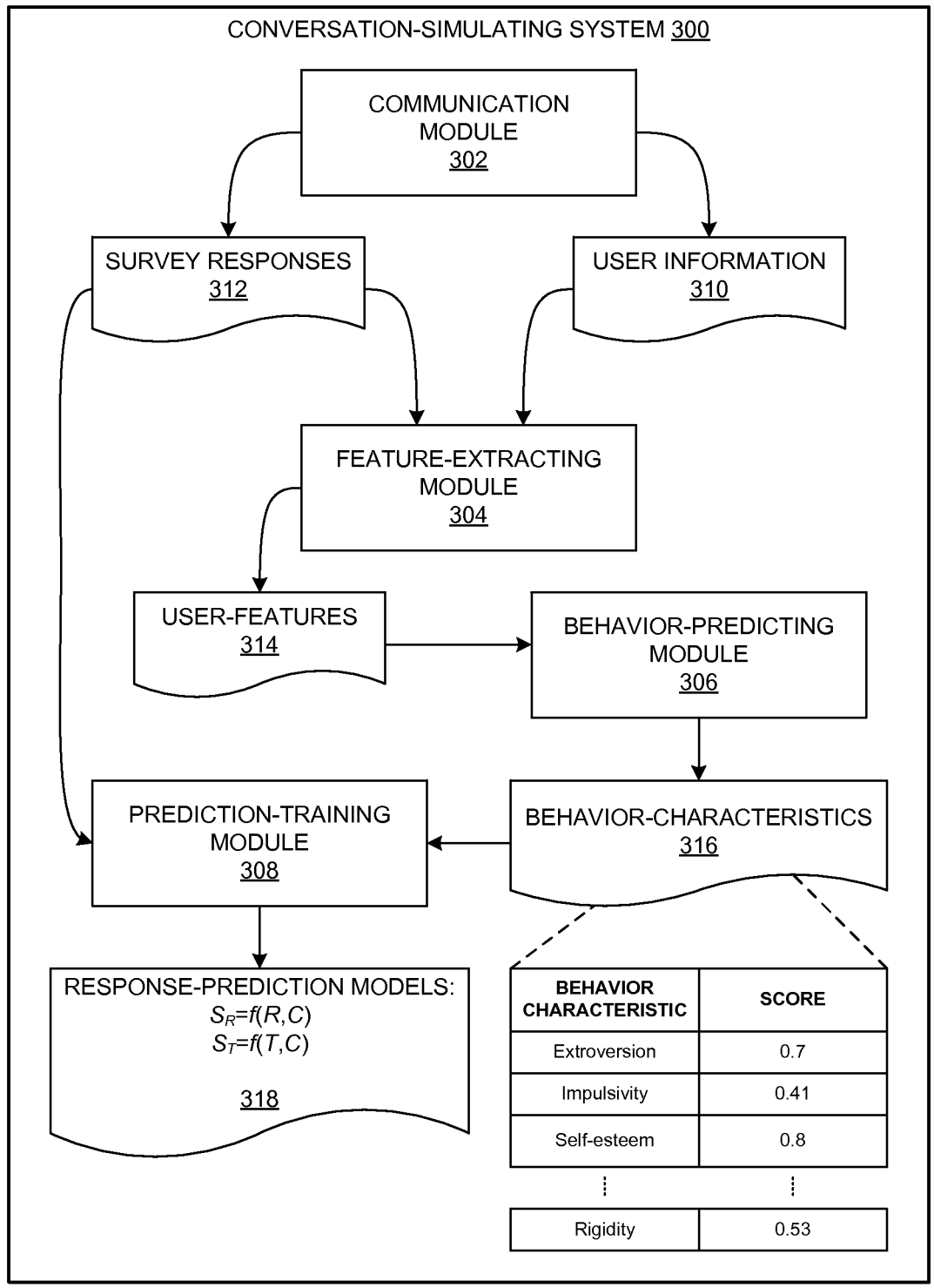
FIG. 3 illustrates a block diagram for a conversation-simulating system that trains a conversation agent in accordance with an embodiment.

FIG. 3 illustrates a block diagram for a conversation-simulating system 300 that trains a conversation agent in accordance with an embodiment. System 300 can include a communication module 302, a feature-extracting module 304, a behavior-predicting module 306, and a prediction-training module 308. Communication module 302 can obtain user information 310, related to the user, from one or more websites or online services that stores user generated content (UGC) from the user. This UGC can indicate the user's behavior characteristics (e.g., personality traits) and the user's preferred communication style. Communication module 302 can also present a survey, and can obtain survey responses 312 from the user. Survey-extracting module 304 can analyze user information 310 and survey responses 312 to determine a set of user-features 314 for the user.

Behavior-predicting module 306 analyzes the extracted user-features 314 to determine behavior-characteristics 316, which indicate scores for various types of behavior characteristics. These scores can fall within a predetermined range, such as within the range [0,1]. For example, the system may determine that the user is somewhat extroverted (represented by a score of 0.7), a little impulsive (represented by an impulsivity score of 0.41) and a little rigid (represented by a rigidity score of 0.53), and that the use has a high self-esteem (represented by a self-esteem score of 0.8).

Prediction-training module 308 then uses behavior-characteristics 316 to generate or update response-prediction models 318. Response-prediction models 318 can include, for example: a relevance function $S_R = f_R(R,C)$ that computes a relevance score $S_R$ for each response R based on the response's features; and a template-relevance function $S_T = f_T(T,C)$ that computes a relevance score for each pre-generated response template T. Conversation-simulating system 300 can use relevance function $S_R$ during a training phase to determine which response features are relevant to users of with certain behavior characteristics.

In some embodiments, prediction-training module 308 can generate or update behavior-predicting model $S_R = f_R(R,C)$ by analyzing survey-responses 312 and behavior characteristics 316 for a plurality of users. Here, C indicates behavior characteristics 316 for a given user, and R indicates a vector of response-features extracted from survey responses 312. These response-features may correspond to words, sentence structure, conversational tone, conversation topics, etc. Function $f_R()$ produces a numeric result $S_R$, which indicates a relevance score for a given response R. In some embodiments, behavior-predicting module 306 employs machine learning techniques to analyze response features related to each response R in the survey, and to generate response-scoring model $S_R = f_R(R,C)$ that system 300 can use to determine which response features are relevant to users with a given behavior characteristic C. Hence, the system can use function $f_R$ to compute a relevance score for any response R, based on the features of response R and a user's behavior characteristics C.

In some embodiments, during a conversation with a user, conversation-simulation system 300 can use pre-generated response templates to generate responses that are tailored to a given user. System 300 can generate this set of response templates ahead of time, such that each response template T is designed to provide an answer or response to a given question or statement from a user. Prediction-training module 308 can then generate and periodically refine a template-relevance function $S_T=f_T(T,C)$ that computes a score $S_T$ indicating how well response template T matches a user's conversation style (based on the user's behavior characteristics C). For example, prediction-training module 308 can use response-scoring model $S_R=f_R(R,C)$ to train template-relevance function $S_T=f_T(T,C)$, based on the features $R_T$ of a given response template T.

System 300 can use template-relevance function $f_T$ to select a response template T for responding to a given user, without having to analyze the individual features of a given response R or response template T. In some embodiments, system 300 can evaluate, at runtime, one or more templates $T_i$ that can be used to respond to a user having characteristics C. System 300 can then use a template $T_i$ with a highest score to generate a response that is tailored to the user. In some other embodiments, conversation-simulating system 300 can pre-compute scores for a plurality of templates to reduce the number of computations that need to be computed at runtime. For example, system 300 may automatically determine (e.g., without user intervention) a limited set of behavior characteristics $C_j$ (e.g., 100 vectors $C_j$) that cover a large percentage of the users (e.g., 75%). Then, for each response template $T_i$, system 300 can use template-relevance function $f_T$ to pre-compute a template-relevance score $S_{T:i,j}$ associated with each behavior characteristic $C_j$.

In some embodiments, behavior-predicting module 306 can employ machine learning techniques to generate template-relevance function $S_T=f_T(T,C)$. For example, behavior-predicting module 306 can employ machine learning techniques to compute behavior characteristics $C_T$ for each response template T, using response-scoring model $S_R=f_R(R,C)$ as an input to the machine-learning process. Then, template-relevance function $S_T=f_T(T,C)$ uses vector $C_T$ to compute a distance between user behavior characteristics C and behavior characteristics $C_T$ related to a template T.

Conversation-simulation system 300 may be realized using one or more integrated circuits, and may include fewer or more modules than those shown in FIG. 3. Further, system 300 may be integrated in a computer system, or realized as a separate device capable of communicating with other computer systems and/or devices.

Figure 4:
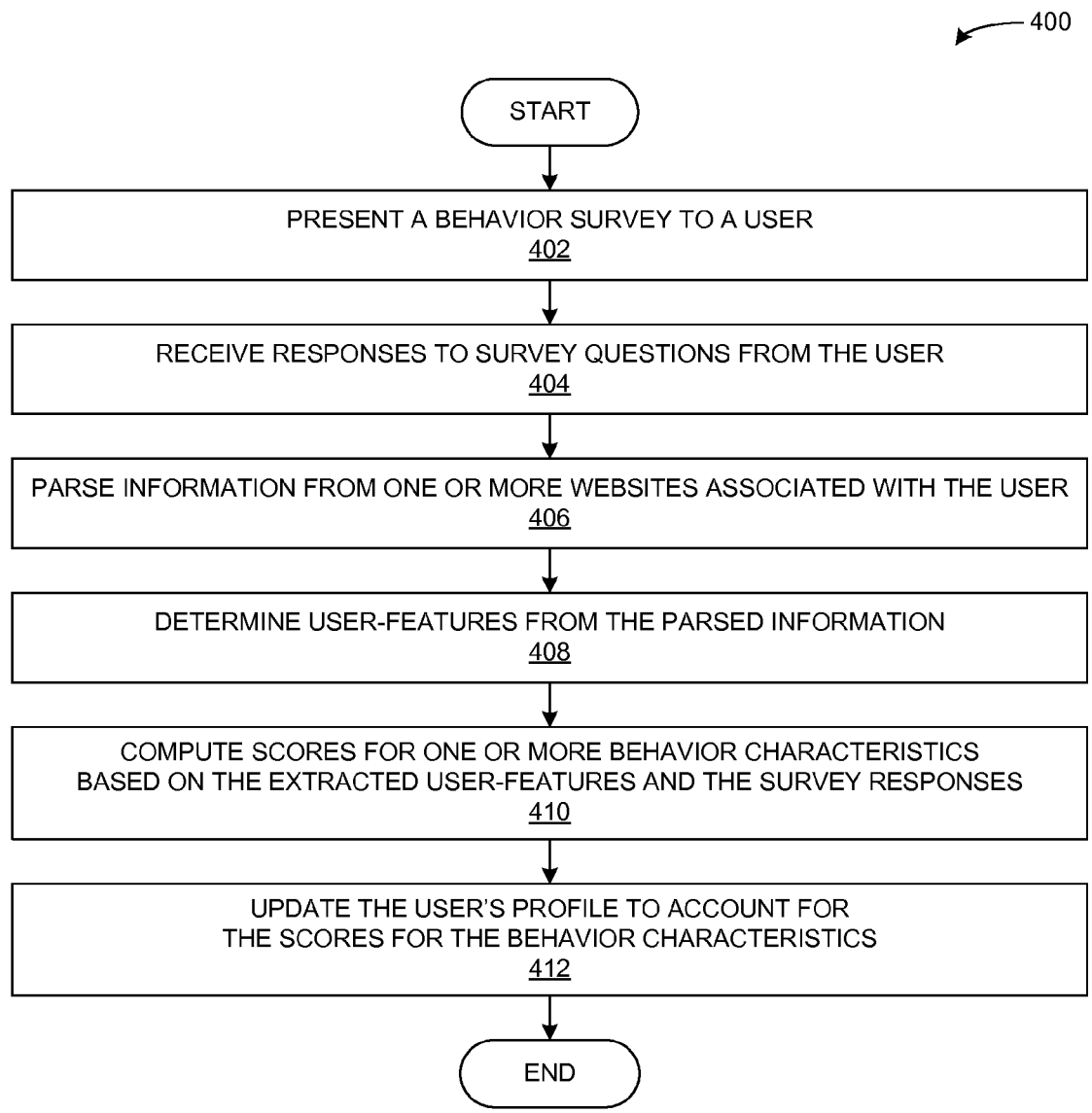
FIG. 4 presents a flow chart illustrating a method for updating a user's profile to reflect behavior characteristics in accordance with an embodiment.

FIG. 4 presents a flow chart illustrating a method 400 for updating a user's profile to reflect behavior characteristics in accordance with an embodiment. During operation, the system can obtain information indicating the user's behavior characteristics and user preferences. For example, the system presents a behavior survey to a user (operation 402), and receives responses to survey questions from the user (operation 404). The survey can include an existing collect of conversations between two or more users and/or service representatives. The user responses can indicate a binary vote, or a numeric score for each conversation entry.

The system can also parse information from one or more websites associated with the user (operation 406), and determines user-features from the parsed information (operation 408). These websites can include social-media websites, such as the Facebook and LinkedIn social-networking websites, the Twitter micro-blogging website, and/or any other website that includes user-generated content (UGC) from the user. The user-features extracted from the user's online content can indicate word choices, sentence structure, conversational tone, conversation topics, etc.

The system then computes scores for one or more behavior characteristics based on the extracted user-features and the survey responses (operation 410). These scores indicate how strongly the behavior characteristics match the user's personality, behavior, and preferences. For example, the behavior characteristics can include one or more of: openness to experiences; conscientiousness; extraversion; agreeableness; neuroticism; self-esteem; harm-avoidance; novelty-seeking; perfectionism; alexithymia; rigidity; impulsivity; disinhibition; psychoticism; and obsessionality. Also, the score for a respective behavior characteristic can fall within a predetermined range (e.g., within the range [0, 1]). In some embodiments, a low score indicates that the behavior characteristic has a low association to the user, and a high score indicates that the behavior characteristic has a high association to the user.

Once the system has computed scores for the behavior characteristics, the system updates the user's profile to account for these scores (operation 412). In some embodiments, the system updates the profile to include a score vector, such that each vector entry stores a score for a corresponding behavior characteristic. Further, the system can update the user's profile to include other information that can be derived from the behavior-characteristic scores. For example, the system can pre-compute relevance scores for different existing response templates, which can make it easier for the system to generate a response to a question from the user when multiple response templates match the question.

Figure 5:
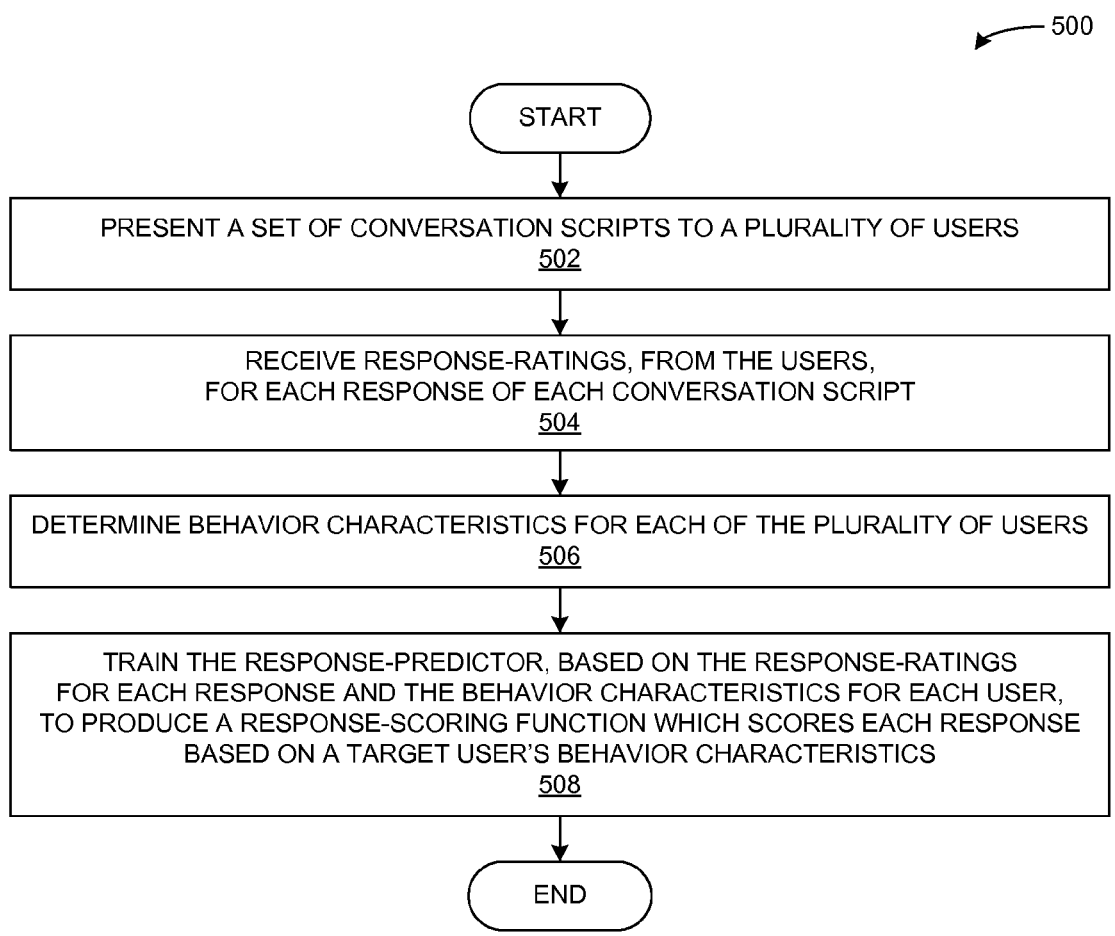
FIG. 5 presents a flow chart illustrating a method for training a response-predictor to select responses that match a user's behavior characteristics in accordance with an embodiment.

FIG. 5 presents a flow chart illustrating a method 500 for training a response-predictor to select responses that match a user's behavior characteristics in accordance with an embodiment. During operation, the system presents a set of conversation scripts to a plurality of users (operation 502), and receives response ratings, from the users, for each response of each conversation script (operation 504).

The system then determines behavior characteristics for each of the plurality of users (operation 506), and trains the response predictor based on the users' response ratings and the behavior characteristics for each user (operation 508). The system can train the response predictor, for example, by producing a relevance function $S_R=f_R(R,C)$ that computes a relevance score $S_R$ for each response R based on the response's features, and/or producing a template-relevance function $S_T=f_T(T,C)$ that computes a relevance score for each pre-generated response template T.

Runtime Conversation Simulation and Predictor Training

Figure 6:
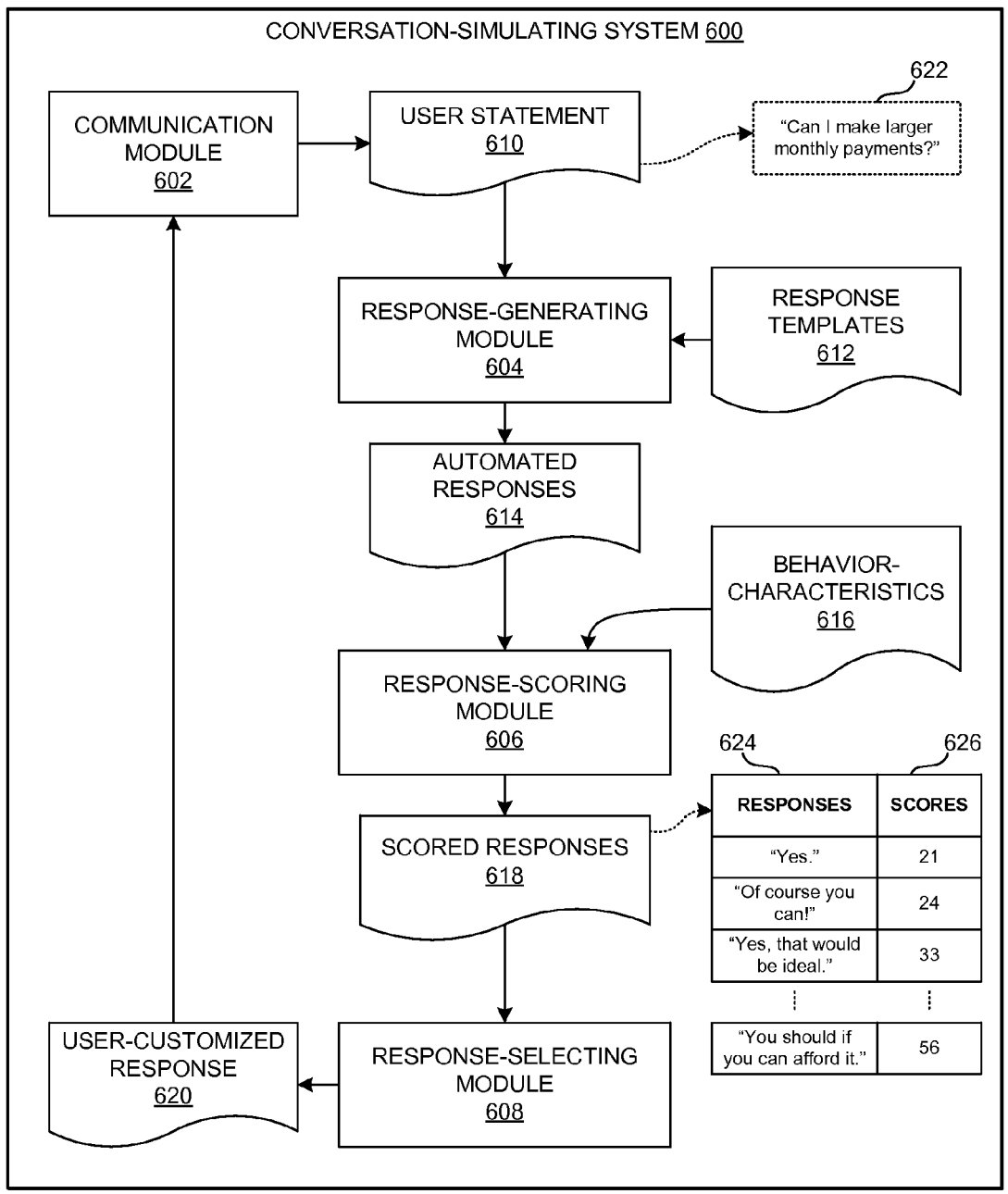
FIG. 6 illustrates a block diagram for a conversation-simulating system that simulates an intelligent conversation with a user based on the user's behavior characteristics in accordance with an embodiment.

FIG. 6 illustrates a block diagram for a conversation-simulating system 600 that simulates an intelligent conversation with a user based on the user's behavior characteristics in accordance with an embodiment. System 600 can include a communication module 602, a response-generating module 604, a response-scoring module 606, and a response-selecting module 608. Communication module 602 can receive a user statement 610 from a user, such as a question. For example, a banking customer may have questions on what services and features are available to him. The customer may look through a list of frequently asked questions on the banks website, but if the customer does not find a relevant answer, the customer can interact with a conversation agent hosted on the bank's website to ask a question. For example, the customer may want to pay down his loans sooner than the loan period, and may ask a question 622 "Can I make larger monthly payments?"

Response-generating module 604 analyzes user statement 610 to generate a set of automated responses 614 that can be used to respond to user statement 610. In doing so, response-generating module 604 can search through response templates 612 to identify one or more response templates that match features from user statement 612, and uses these selected response templates to generate automated responses 614. For example, each response template can be associated with one or more conversation "features," such as words, phrases, topics that are mentioned within the user's statement. Response generating module 604 extracts features from user statement 610, and uses these features to select one or more relevant templates from response templates 612.

Response-scoring module 606 scores automated responses 614 based on the user's behavior-characteristics 616, to produce scored responses 618. For example, response-generating module 604 may have determined that the answer to the user's question 622 is "Yes," and selects various automated responses 624 that can be used to respond to the user. Responses 624 can provide the same answer to the user, but may use different communication styles to communicate the answer. These responses can include "Yes," "Of course you can!" "Yes, that would be ideal." and "You should if you can afford it." Scored responses 618 can include the set of responses 624, and can include a corresponding set of response scores 626.

In some embodiments, each of responses 624 can be associated with one or more behavior-characteristics. For example, each of responses 624 can have an associated scoring vector, which includes a score for each of a plurality of behavior-characteristics, similar to how scores are used to indicate a user's behavior characteristics. The score vector for a given response indicates behavior characteristics for those users that would respond well to such a response. To compute a score for a given response, the system can compute a distance metric between the response's score vector and the user's behavior score vector. Following the example from above, the user may be identified as intelligent and detail-oriented, which can cause response-scoring module 606 to assign a high score to responses that may provide a high level of detail, such as the response "You should if you can afford it."

Response-selecting module 608 then selects the highest-scoring response, which is customized for the user, to produce user-customized response 620. Communication module 602 then provides user-customized response 620 to the user, for example, via a chat interface presented via a web browser or via a standalone application.

Conversation-simulation system 600 may be realized using one or more integrated circuits, and may include fewer or more modules than those shown in FIG. 6. Further, system 600 may be integrated in a computer system, or realized as a separate device capable of communicating with other computer systems and/or devices.

Figure 7:
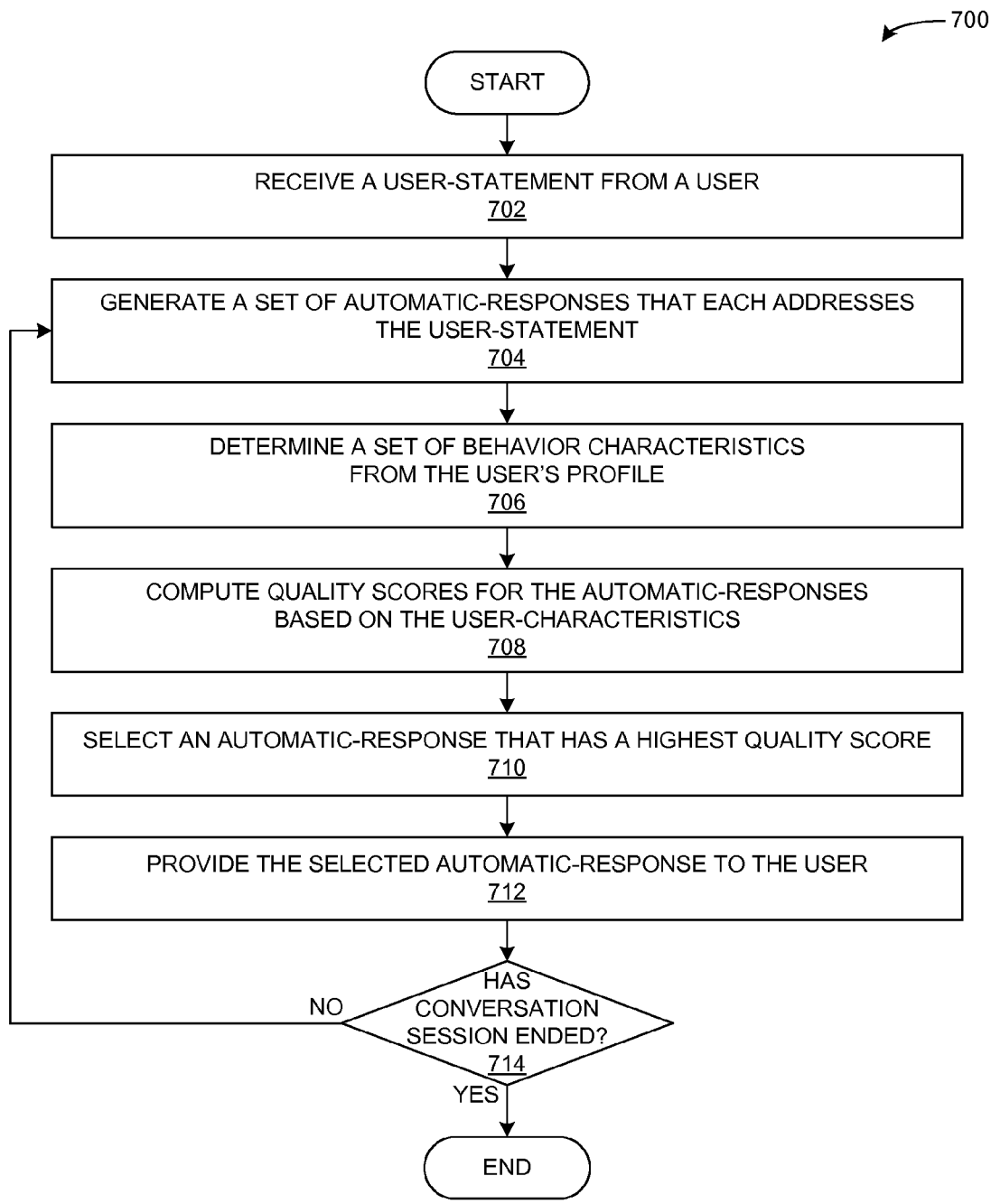
FIG. 7 presents a flow chart illustrating a method for simulating an intelligent conversation with a user in accordance with an embodiment.

FIG. 7 presents a flow chart illustrating a method 700 for simulating an intelligent conversation with a user in accordance with an embodiment. During operation, the system receives a user-statement from a user (operation 702). The user statement can specify a question from the user, can specify facts being communicated by the user, and/or can imply an emotion felt by the user (e.g., via an overtone). The user statement can also specify a general conversation statement or form of speech from the user that is meant to adjust the conversation's communication style.

The system then generates a set of automatic responses that each can address the user's statement (operation 704). Recall that the system selects the best response to present to the user, and does not present the full set of automatic responses to the user. Hence, to select the optimal response, the system determines a set of behavior characteristics from the user's profile (operation 706), and computes relevance scores for the automatic responses based on the user characteristics (operation 708). The system can compute the relevance scores $S_T$ using template-relevance function $S_T = f_T(T,C)$. The system then selects an automatic response that has a highest relevance score (operation 710), and provides the selected automatic response to the user (operation 712).

In some embodiments, each automatic response can be associated with a target behavior-characteristic vector, which indicates the behavior characteristics to which the response is most suitable. Hence, the system can compute a relevance score for a respective response by computing a distance metric between the user's behavior-characteristics vector and the target behavior-characteristic vector for the target response.

Figure 8:
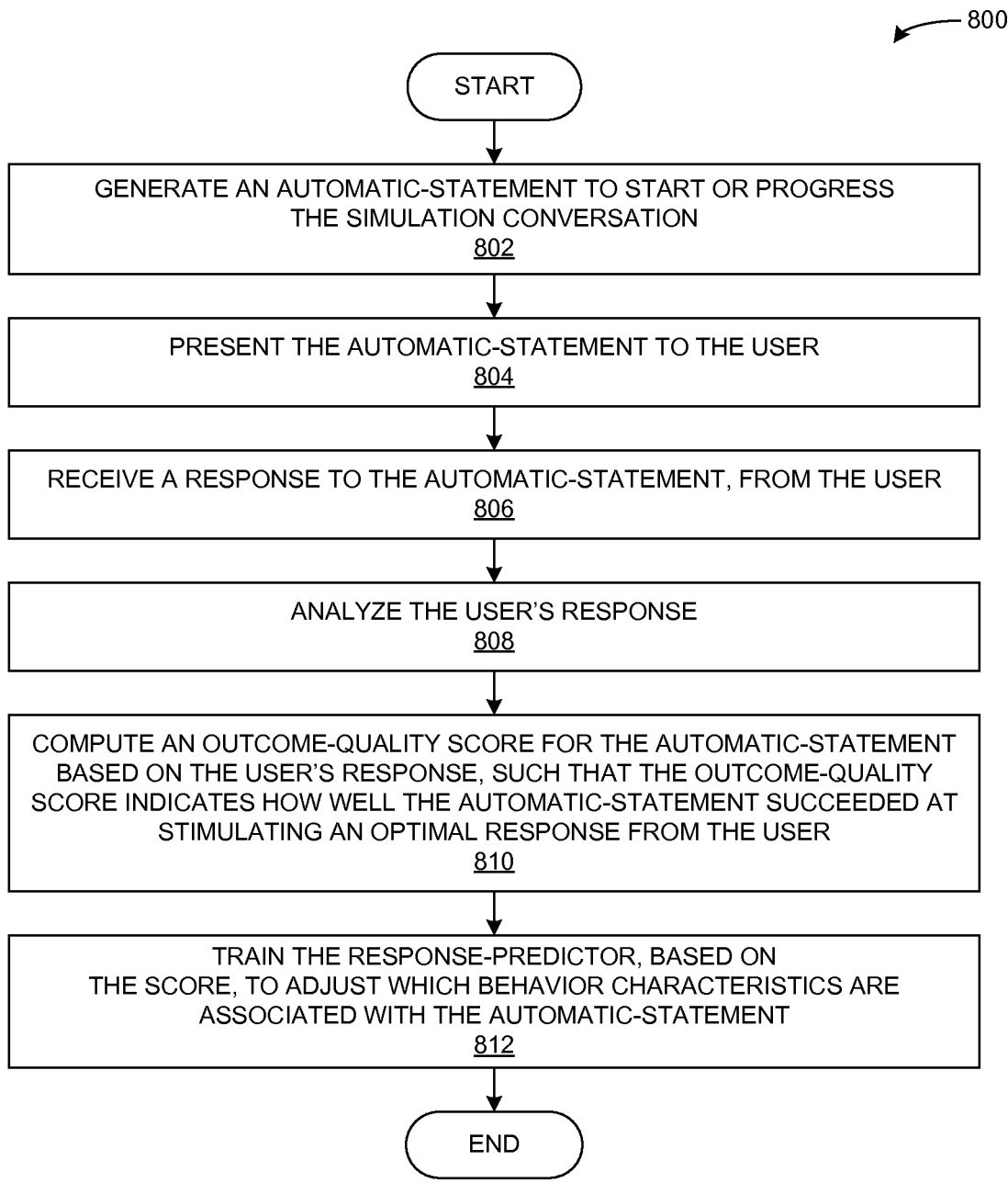
FIG. 8 presents a flow chart illustrating a method for training the response-predictor during a simulated conversation with a user in accordance with an embodiment.

FIG. 8 presents a flow chart illustrating a method 800 for training the response-predictor during a simulated conversation with a user in accordance with an embodiment. During operation, the system generates an automatic statement to start or to progress the simulated conversation (operation 802). The system then presents the automatic statement to the user (operation 804), and receives a response to the automatic statement from the user (operation 806).

Recall that the user's response can include a variety of explicit and/or implicit communication features. These communication features can specify a question from the user, can specify facts being communicated by the user, can imply an emotion felt by the user (e.g., via an overtone), and/or can specify a general conversation statement or express a form of speech that is meant to adjust the conversation's communication style. The system analyzes the user's response to identify a set of communication features (operation 808), and computes an outcome-quality score for the automatic statement based on the communication features of the user's response (operation 810). This outcome-quality score can indicate how well the automatic statement succeeded at stimulating an optimal response from the user.

The system then trains the response predictor, based on the computed score, to adjust which behavior characteristics are associated with the automatic statement (operation 812). For example, the system can refine template-relevance function $S_T = f_T(T,C)$, based on the outcome-quality score for a user having behavior-characteristics C, so that the template-relevance score $S_T$ shifts toward the outcome-quality score.

Figure 9:
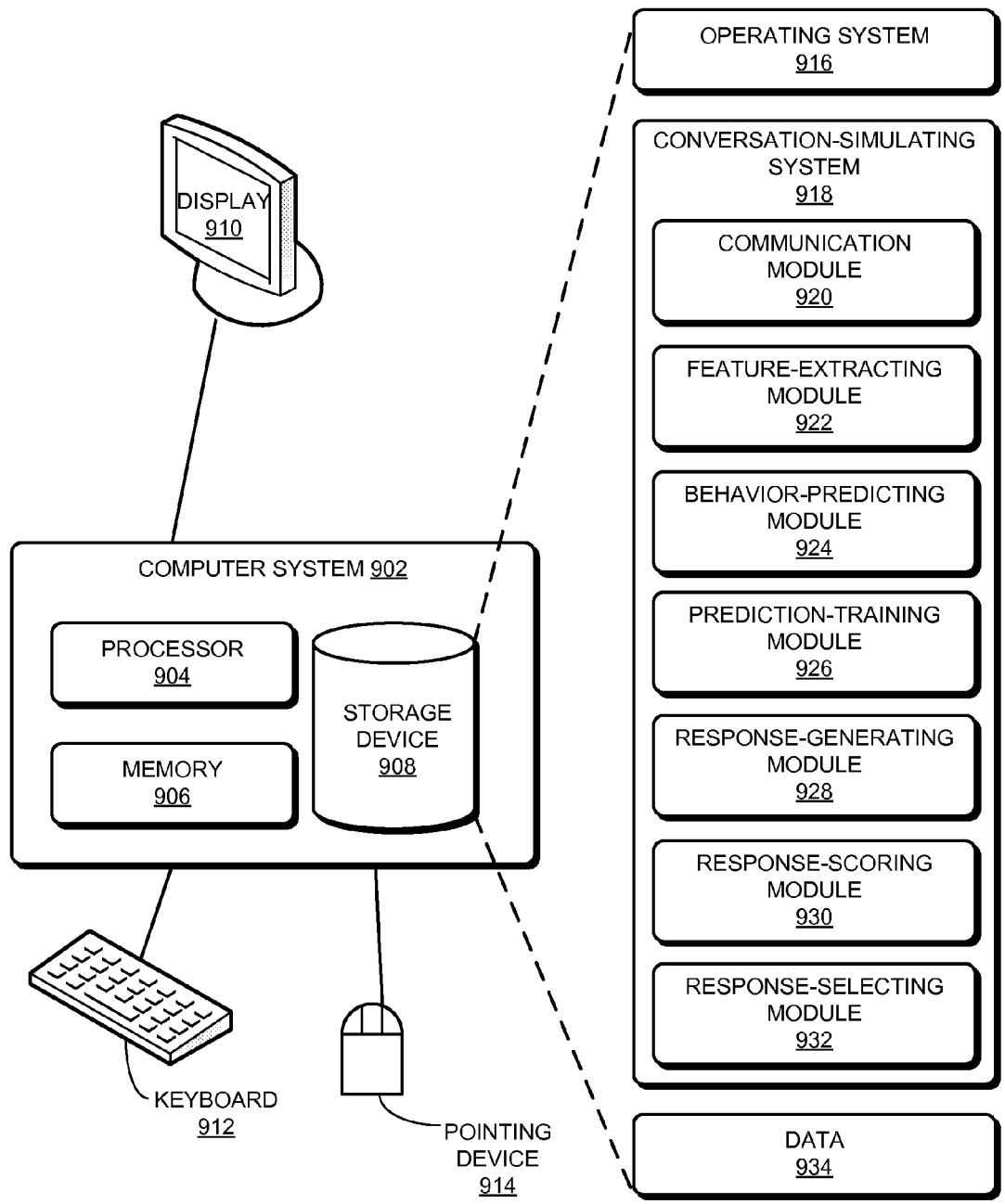
FIG. 9 illustrates an exemplary computer system that facilitates simulating an intelligent conversation with a user in accordance with an embodiment.

FIG. 9 illustrates an exemplary computer system 900 that facilitates simulating an intelligent conversation with a user in accordance with an embodiment. Computer system 902 includes a processor 904, a memory 906, and a storage device 908. Memory 906 can include a volatile memory (e.g., RAM) that serves as a managed memory, and can be used to store one or more memory pools. Furthermore, computer system 1002 can be coupled to a display device 910, a keyboard 912, and a pointing device 914. Storage device 908 can store operating system 916, a conversation-simulating system 918, and data 934.

System 918 can include instructions, which when executed by computer system 1002, can cause computer system 902 to perform methods and/or processes described in this disclosure. Specifically, system 918 may include instructions for obtaining information related to a user to train a response-predicting model, and for sending and/or receiving messages during a simulated conversation with user (communication module 920). System 918 can also include instructions for extracting features from the information related to the user (feature-extracting module 922), and can include instructions for determining behavioral characteristics for the user based on the extracted features (behavior-predicting module 924). Further, system 918 can include instructions for training the response-predicting model based on the user's behavioral characteristics, and the user's preferred conversation style (prediction-training module 922).

Further, system 918 can include instructions for generating multiple alternative automatic-responses that each can be used to respond to a message received from the user during the simulated conversation (response-generating module 924), and includes instructions for scoring each of the responses based on the user's behavioral characteristics (response-scoring module 922). System 918 can also include instructions for selecting the highest-scoring response, and for configuring communication module 918 to provide the selected response to the user (response-selecting module 924).

Data 934 can include any data that is required as input or that is generated as output by the methods and/or processes described in this disclosure. Specifically, data 934 can store at least a behavioral survey, conversation scripts, user profiles, user-related data, response templates, and statement-to-response mappings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
receiving, by a computing device, a user-statement from a user during a simulated conversation with the user;
determining a set of automatic-statements that each responds to the user-statement;
determining a set of behavior-characteristics associated with the user;
computing relevance scores for the automatic-statements based on the behavior-characteristics, wherein a respective relevance score indicates an outcome quality that the user is likely to perceive for the automatic-statement as a response to the user-statement, wherein computing the respective relevance score for a respective automatic-statement involves computing a template-relevance score using a response-prediction function that takes as input a response template and the user's behavior-characteristics, and wherein the template-relevance score indicates how well the response template matches a conversation style for a user having the behavior characteristics;
selecting an automatic-statement that has a highest relevance score from the set of automatic-statements; and
providing the selected automatic-statement to the user.

2. The method of claim 1, wherein a respective behavior-characteristic indicates a personality-trait category, and indicates a numeric score for the corresponding personality-trait category.

3. The method of claim 2, wherein the personality-trait categories include one or more of:
openness to experiences;
conscientiousness;
extraversion;
agreeableness;
self-esteem;
novelty-seeking;
perfectionism;
rigidity;
impulsivity;
harm-avoidance;
disinhibition;
alexithymia;
neuroticism;
psychoticism; and
obsessionality.

4. The method of claim 2, further comprising:
identifying a personality-trait category to score for the user;
determining an automatic-response associated with the personality-trait category;
providing the automatic-response to the user;
responsive to receiving a response from the user for the automatic-response, computing a score for the personality-trait category for the user; and
updating the user's behavior-characteristics to assign the computed score to the personality-trait category.

5. The method of claim 1, wherein determining the set of automatic-statements involves:
determining a query from the user's user-statement;
identifying, from a response-template repository, one or more response templates that match at least one query attribute of the query, wherein the response-template repository includes a set of pre-generated response templates that are each associated with at least one corresponding query attribute; and
generating the set of automatic-statements based on the identified response templates.

6. The method of claim 1, further comprising:
providing a survey that indicates a set of conversation scripts to a plurality of users, and solicits a response rating for one or more conversation responses in the conversation script;

obtaining response ratings, from the users, for the conversation responses;
determining behavior characteristics for each of the plurality of users; and
training the response-prediction function based on the behavior preferences for the plurality of users, and the response ratings from each of the plurality of users.

7. A non-transitory computer-readable storage medium storing instructions that when executed by a computer cause the computer to perform a method, the method comprising:
receiving a user-statement from a user during a simulated conversation with the user;
determining a set of automatic-statements that each responds to the user-statement;
determining a set of behavior-characteristics associated with the user;
computing relevance scores for the automatic-statements based on the behavior-characteristics, wherein a respective relevance score indicates an outcome quality that the user is likely to perceive for the automatic-statement as a response to the user-statement, wherein computing the respective relevance score for a respective automatic-statement involves computing a template-relevance score using a response-prediction function that takes as input a response template and the user's behavior-characteristics, and wherein the template-relevance score indicates how well the response template matches a conversation style for a user having the behavior characteristics;
selecting an automatic-statement that has a highest relevance score from the set of automatic-statements; and
providing the selected automatic-statement to the user.

8. The storage-medium of claim 7, wherein a respective behavior-characteristic indicates a personality-trait category, and indicates a numeric score for the corresponding personality-trait category.

9. The storage-medium of claim 8, wherein the personality-trait categories include one or more of:
openness to experiences;
conscientiousness;
extraversion;
agreeableness;
self-esteem;
novelty-seeking;
perfectionism;
rigidity;
impulsivity;
harm-avoidance;
disinhibition;
alexithymia;
neuroticism;
psychoticism; and
obsessionality.

10. The storage-medium of claim 8, wherein the method further comprises:
identifying a personality-trait category to score for the user;
determining an automatic-response associated with the personality-trait category;
providing the automatic-response to the user;
responsive to receiving a response from the user for the automatic-response, computing a score for the personality-trait category for the user; and
updating the user's behavior-characteristics to assign the computed score to the personality-trait category.

11. The storage-medium of claim 7, wherein determining the set of automatic-statements involves:
determining a query from the user's user-statement;
identifying, from a response-template repository, one or more response templates that match at least one query attribute of the query, wherein the response-template repository includes a set of pre-generated response templates that are each associated with at least one corresponding query attribute; and
generating the set of automatic-statements based on the identified response templates.

12. The storage-medium of claim 7, wherein the method further comprises:
providing a survey that indicates a set of conversation scripts to a plurality of users, and solicits a response rating for one or more conversation responses in the conversation script;
obtaining response ratings, from the users, for the conversation responses;
determining behavior characteristics for each of the plurality of users; and
training the response-prediction function based on the behavior preferences for the plurality of users, and the response ratings from each of the plurality of users.

13. An apparatus, comprising:
a communication module to receive a user-statement from a user during a simulated conversation with the user;
a response-generating module to determine a set of automatic-statements that each responds to the user-statement;
a response-scoring module to compute relevance scores for the automatic-statements based on behavior-characteristics associated with the user, wherein a respective relevance score indicates an outcome quality that the user is likely to perceive for the automatic-statement as a response to the user-statement, wherein computing the respective relevance score for a respective automatic-statement involves computing a template-relevance score using a response-prediction function that takes as input a response template and the user's behavior-characteristics, and wherein the template-relevance score indicates how well the response template matches a conversation style for a user having the behavior characteristics; and
a response-selecting module to select an automatic-statement that has a highest relevance score from the set of automatic-statements;
wherein the communication module is further configured to provide the selected automatic-statement to the user.

14. The apparatus of claim 13, wherein a respective behavior-characteristic indicates a personality-trait category, and indicates a numeric score for the corresponding personality-trait category.

15. The apparatus of claim 14, further comprising a behavior-predicting module to:
identify a personality-trait category to score for the user;
determine an automatic-response associated with the personality-trait category;
provide the automatic-response to the user;
compute a score for the personality-trait category for the user, responsive to receiving a response from the user for the automatic-response; and
update the user's behavior-characteristics to assign the computed score to the personality-trait category.

16. The apparatus of claim 13, wherein while determining the set of automatic-statements, the response-generating module is further configured to:
determine a query from the user's user-statement;

identify, from a response-template repository, one or more response templates that match at least one query attribute of the query, wherein the response-template repository includes a set of pre-generated response templates that are each associated with at least one corresponding query attribute; and generate the set of automatic-statements based on the identified response templates.

17. The apparatus of claim 13, wherein the communication module is further configured to:

provide a survey that indicates a set of conversation scripts to a plurality of users, and solicits a response rating for one or more conversation responses in the conversation script; and obtain response ratings, from the users, for the conversation responses; and wherein the apparatus further comprises a prediction-training module to:

determine behavior characteristics for each of the plurality of users; and train the response-prediction function based on the behavior preferences for the plurality of users, and the response ratings from each of the plurality of users.

* * * * *